United States Patent Office 3,383,330
Patented May 14, 1968

3,383,330
METHOD OF PREPARING CATALYSTS
Tzu Liang Kang, Brecksville, Ohio, assignor to The B. F. Goodrich Company, New York, N.Y., a corporation of New York
No Drawing. Filed July 6, 1964, Ser. No. 380,683
16 Claims. (Cl. 252—437)

ABSTRACT OF THE DISCLOSURE

Improved catalysts for use in oxidizing and ammoxidizing olefins, having the catalyst ingredients uniformly coated on particulate silicic carrier surfaces, are prepared by first providing separate aqueous slurries of silicic carrier containing the water soluble molybdenum salt, the tellurium salt, and the manganese pyrophosphates, which slurries are then mixed together so that the resulting precipitated catalysts are deposited on the silicic carrier, which is thereafter dried and calcined.

---

This invention relates to a method for making a supported catalyst which is useful for oxidation and ammoxidation of olefins to olefinic carboxylic acids, and aldehydes and olefinic nitriles, and more particularly pertains to a method of making a catalyst in which the catalyst ingredients are uniformly coated on a silicic carrier surface.

The oxidation and ammoxidation of propylene or butylenes, respectively, to acrylic acid and acrolein, methacrylic acid and methacrolein and acrylonitrile and methacrylonitrile are effected best with catalysts containing heavy metals and which have high densities in addition to being relatively costly. It is, therefore, desirable, from a cost standpoint, to use a comparatively cheap support and, from a technical standpoint, to use a support that will have a lower final density for easier fluidization, while maintaining the high catalytic activity and a highly active catalyst surface area of the ingredients responsible for effecting the reaction desired. To meet these requirements, it is highly desirable to have the complex catalyst cover as much of the surface of the carrier as possible, because the carrier has no catalytic activity. In fact, exposed surfaces of carrier seem to be deterimental because they appear to accelerate decomposition of either the hydrocarbon reactants or the desired end products to carbon oxides. The final catalytic composition or complex is insoluble in pure water, but the individual essential ingredients can be dissolved in neutral, acidic or ammoniated aqueous systems, usually as salts, which when combined in certain proper order from a precipitate.

The invention comprises separately impregnating on a solid particulate carrier aqueous solutions of individual components of the catalyst then combining the so impregnated carrier particles to form a precipitate in situ on the surface of the carrier, and thereafter drying and calcining before comminution to the desired size. This procedure can also be termed a co-precipitation of impregnated catalyst ingredients on the carrier surface. The drying can be accomplished in shallow layers or, preferably, the mixture of separately impregnated supports can be spray dried for greater uniformity and then calcined. Typical catalysts that are useful for olefin oxidation and ammoxidation contain metals in the form of molybdates, phosphates, pyrophosphates or phosphomolybdates, in addition to co-catalysts; activators and promoters such as $TeO_2$ and $HReO_4$, $R_2O_7$ and selenium compounds, generally as oxides.

Representative catalysts are nickel molybdate with tellurium oxide with or without perrhenic acid or $Re_2O_7$, cobalt molybdate with $TeO_2$ with or without perrhenic acid or $Re_2O_7$, copper pyrophosphate with tellurium oxide and $Re_2O_7$, a catalyst composed of manganese pyrophosphate ammonium molybdate and $TeCl_4$, ammonium tellurate or $TeO_2$, as disclosed in pending patent application Ser. No. 338,617, filed Jan. 20, 1964 now Patent 3,228,890 in the name of Jamal S. Eden, bismuth, iron, copper, tin, lead, tungsten and antimony molybdates or phosphomolybdates, with or without rhenium oxides, as mixture of silver and either copper or iron pyrophosphates or both, molybdenum, tungsten, uranium, vanadium, tantalum, chromium, bismuth, zinc, antimony, arsenic, tin, lead or silver molybdotellurates.

In this specification and claims the term "water soluble inorganic tellurium salt" is intended to include compounds of tellurium which are truly water soluble and compounds of tellurium which are dissolved in an aqueous mineral acid. A representative mixture of the latter type is $TeO_2$ in aqueous HCl, $HNO_3$ or other mineral acid.

The supports are finely divided silicic materials. Representative silicic supports are colloidal silica, low surface silica gel, silica alumina containing 10–30% alumina and 90 to 70% by weight of silica, diatomaceous earth, such as the Celite materials which are skeletal, kieselguhr and clays. Preferred catalyst supports are low surface area (260 sq. m./g. or less) silica gel and the silica alumina described above.

Example I

The support in this instance was Celite V, which are calcined aggregates that maintain the diatomaceous silica microscopic particle structure. The principal phase is a minor oristobalite, with a skeletal density of 2 g./cc. determined in water, a bulk density of .39 g./cc. (tamped). A surface area of 3.6 sq. m./g. and a temperature resistance of 2100° F.

The catalyst is prepared as follows:

(a) Dissolve 211.92 g. of ammonium molybdate in 200 ml. of water at 50–60° C. Add 132 g. of the Celite and stir for about ½ to 1 hour to thoroughly impregnate the catalyst with the molybdate solution.

(b) Dissolve 102.15 g. $TeO_2$ (technical) in 216 ml. of concentrated HCl at about 50–60° C. Add 105 g. Celite and stir thoroughly to impregnate the support.

(c) Prepare a solution of 151.3 g. $MnCl_2 4H_2O$ in 140 ml. water at 50–60° C. and add 92.4 g. of 85% $H_3PO_4$. Add 105 g. of Celite and blend thoroughly to impregnate the solution on the carrier. Add the slurry of the tellurium compound to the slurry of the $MnCl_2$—$H_3PO_4$ mixture, and stir for about ½ to 1 hour. Finally, add the slurry of ammonium molybdate to the mixture described immediately above and blend thoroughly by stirring for ½ to 1 hour.

No precipitate of soluble ingredients is formed until the molybdate slurry is added to the $MnCl_2$—$H_3PO_4$—$TeO_2$—HCl—Celite mixture When the final blend is prepared precipitation of a high proportion of the catalyst is effected on the surface of the support.

The catalyst can be spread in trays in thin layers and dried at a temperature up to 100° C., or it can be spray dried.

After drying the catalyst can be calcined or baked at 350° C.–550° C., usually 350° C.–450° C., for 12–16 hours.

The catalyst described above has a $Mo/Te/Mn_2 P_2O_7$ ratio, on a molar basis of 75/40/25. It contains about 46.8% by weight of support and 53.2% active ingredients.

The catalyst was tested in a fluid bed reactor, using a feed of one mol propylene 2.6 mols oxygen, supplied as air, and 2.69 mols of water vapor at 385° C., and a hot contact time of 40.6 seconds. All the propylene was converted with a 46% yield of acrylic acid and 24.2% yield of acrolein, for a total efficiency of 70.2%.

In another run using a feed ratio of 4.58 mols oxygen (supplied as air), and 4.23 mols of water vapor per mol of propylene, at a temperature of 385° C. and a contact time of 18.7 seconds, 82% of the propylene was converted with a 49.1% yield of acrolein and 11.4% yield of acrylic acid. In this test the reactor contained 8 effective sieve plates spaced at 3 inch intervals.

For comparative purposes a catalyst was prepared by separately impregnating Celite with each of the aqueous solutions mentioned above, but the impregnated ingredients were dried and comminuted, screened and physically mixed for 16 hours and then baked together at 400° C. When tested with a feed containing one mol of propylene, 2.6 mols oxygen supplied as air, and 4.4 mols of water vapor at 400° C., with a contact time of 16.4 seconds, 94.5% of the propylene was converted with a 10.4% yield of acrylic acid and 5.6% yield of acrolein. The CO and $CO_2$ produced was unusually high for a reaction of this type.

Example II

The catalyst in this example was prepared by adding 132 g. of Celite V to a solution of 211.92 g. of ammonium molybdate in 220 ml. water; adding 105 g. Celite V to a solution of 63.84 g. of $TeO_2$ in 135 ml. concentrated HCl diluted with 85 ml. water and 105 g. of Celite V to a solution containing 158.3 g. $MnCl_2 \cdot 4H_2O$ 510 ml. water and 92.4 g. of 85% $H_3PO_4$. The slurries were stirred thoroughly as described above and mixed in the order indicated and dried and baked as described above. This finished catalyst had a molar ratio of 75 $MoO_3$/25 $TeO_2$/25 $Mn_2P_2O_7$ by weight. The Celite content was 49.4% by weight and the remainder was active catalyst.

When tested for propylene oxidation with a molar feed ratio of 1 $C_3H_6$/2.5 $O_2$/3.9 $H_2O$ at 375° C. and a 21.4 second contact time in a fluid bed reactor, it converted 97.3% of the olefin with a yield of 29.8% acrolein and 38.4% acrylic acid.

This catalyst fluidized very efficiently in the reactor.

Example III

The support in this example was a low surface area (260 sq. M./g. or less) silica gel. To a solution of 423.8 g. of ammonium molybdate in 400 ml. water were added 200 g. of silica gel.

A solution of 127.69 g. of $TeO_2$ (Tech) in 270 ml. concentrated HCl was prepared and 126.8 g. of silica gel added.

To a mixture of 316.7 g. $MnCl_2 \cdot 4H_2O$ in 100 ml. water and 184.8 g. of 85% $H_3PO_4$ were added 119.1 g. of silica gel.

The order of finally mixing these catalyst ingredients was the same as in Example 1.

When tested for its ability to oxidize propylene in feed ratio of 1 mol propylene, 2.69 mols $O_2$, and 4.3 mols $H_2O$ at 350° C., and a contact time of 7.4 seconds, 93.5% of the propylene was converted with yields of 29.2% acrylic acid at 35.2% acrolein.

Example IV

The catalyst was prepared by dissolving 317.82 g. of ammonium molybdates in 300 ml. water and mixing therein 200 g. of Celite V, which was previously screened through a 325 mesh sieve. The mixture was stirred for about a half hour.

A solution of 158.1 g. of ammonium tellurate was prepared in 135 ml. of concentrated $HNO_3$. To this solution we added 157 grams of the Celite V described above, and stirred for one half hour.

429.48 grams of a 50% by weight aqueous solution $Mn(NO_3)_2$ were mixed with 138.6 g. of 85% $H_5PO_4$. Then 157 grams of Celite V were added to this mixture and stirred for one half hour.

The ammonium molybdate-Celite mixture was added to the slurry containing the tellurium salt, and then the $Mn(NO_3)_2$—$H_3PO_4$ slurry was added to the tellurium-molybdate slurry. The final slurry was mixed thoroughly for one half hour to provide intimate contact between the separately impregnated ingredients.

The mixture was diluted with 500 ml. water and then dried by spraying into a chamber through which a current of air preheated to 100–150° C. was passed. The dried catalyst was thereafter calcined at 400–450° C. for 16 hours.

When tested for its ability to oxidize propylene in a fluid bed system by passing a mixture of 3.5 mols of oxygen, supplied as air, 3.9 mols of water vapor and one mol of propylene through the catalyst at 400° C. with a contact time of 23.7 seconds, 99.1% of the propylene was converted to produce a yield of 40.9% acrylic acid and 15.7% acrolein.

A colloidal silica was substituted for the Celite V for preparing a catalyst by the spray drying procedure, having a molar ratio of $MoO_3$ 75/$TeO_2$ 40/$Mn_2P_2O_7$ 25/ $SiO_2$ 100. After spray drying this catalyst was baked for 16 hours at 400° C.

Data obtained during the oxidation of propylene with this catalyst in a fluidized bed are tabulated below. In each case the molar ratios of oxygen and water vapor are based on one mol of propylene in the feed gas into the reactor.

| $O_2$ | $H_2O$ | Contact Time, sec. | Temp., ° C. | Percent Conversion Propylene | Percent Yield Acrolein | Percent Yield Acrylic Acid |
|---|---|---|---|---|---|---|
| 2.6 | 3.5 | 31.8 | 375 | 100 | 25.2 | 41.8 |
| 3.2 | 4.6 | 36.6 | 375 | 100 | 21.8 | 44.3 |
| 3.0 | 3.9 | 45.6 | 375 | 100 | 15.6 | 47.5 |

Example V

The catalyst support in this instance was a silica-alumina having an $SiO_2$ content of about 87% and $Al_2O_3$ content of about 13% by weight. The surface area of the support prior to impregnation with catalyst ingredients was 4 square meters per gram.

The catalyst was prepared by dissolving 105.94 g. of ammonium molybdate in 110 ml. water and adding 270 g. of the silica-alumina support thereto with stirring for about a half hour after addition of the support ingredient.

Into a solution of 28 g. $HNO_3$ in 48 g. of water were added 63.41 g. of ammonium tellurate and stirred until dissolved. Then, 200 g. of the silica-alumina were added with stirring, which was continued for about one half hour after completion of the addition of the support.

The third catalyst component was prepared by adding 46.2 g. of 85% $H_3PO_4$ to a solution of 143.16 g. of $Mn(NO_3)_2$ in sufficient water to provide a 50% solution of the latter. Thereafter, 280 g. of the silica-alumina were added to this aqueous solution and stirred for about one half hour after the support was added.

The ammonium tellurate containing slurry was added to the slurry containing the ammonium molybdate. Then the manganese phosphate slurry was blended into the slurry of the remaining ingredients. Stirring was continued for about an hour to insure adequate comingling of the various ingredients and to co-precipitate the catalyst ingredients on the surface of the support. Thereafter, the catalyst was dried, then baked at about 400° C. for 16 hours, comminuted, and screened. The portion passing through an 80 mesh sieve (U.S. Sieve size) was used for test purposes.

The molar ratio of the active ingredients in the catalyst was $MoO_3$ 75/$TeO_2$ 26.75/$Mn_2P_2O_7$ 25. The percentages of ingredients by weight was $MoO_3$ 9.314/$TeO_2$ 3.683/$Mn_2P_2O_7$ 6.121 and support 80.882.

With this catalyst, it is possible to produce, consistently, from propylene yields of 70% or more of a mixture of acrolein and acrylic acid with efficiencies above 70%.

This, of course, means that conversion of the propylene is also very high. In the table below, data are given for a series of runs.

| $O_2/C_3H_6$ | $H_2O/C_3H_6$ | Contact Time, sec. | Temp., °C. | Percent Conversion $C_3H_6$ | Percent Yield Acrolein | Percent Acrylic Acid |
|---|---|---|---|---|---|---|
| 3.03 | 4.26 | 23.6 | 400 | 96.3 | 39.4 | 36.4 |
| 3.07 | 4.02 | 28.7 | 400 | 98.0 | 33.6 | 38.3 |
| 3.01 | 4.20 | 23.9 | 385 | 87.7 | 54.0 | 27.9 |

The catalyst in a 9.08 cm.² reactor filled a 37 inch depth prior to fluidization.

If it is desired to use colloidal silica in place of Celite V, this can be done by use of aqueous suspensions of silica, such as Ludox, which is a 30% colloidal silica dispersion.

In place of ammonium molybdate, molybdic acid or water soluble salts of molybdenum containing compounds can be used. They include but are not limited to the molybdenum oxyhalides particularly the oxy, di and tetra chloride, iodides, fluorides and bromides, molybdenum thiocyanate and $MoS_3$.

Water soluble salts of $TeO_2$ such as ammonium tellurate, $TeCl_4$, $Te(NO_3)_4$ in acid systems can replace the $TeO_2$ in equivalent quantities.

Manganese chloride can be replaced with other water soluble manganese salts such as manganese iodides, bromides, fluoride, $Mn_2O_7$, mangenous dihydrogen phosphate, manganese sulfate, thiocyanate and dithionate.

The sulfur containing salts are not preferred because of the difficulty of converting the ingredients to the oxides.

What is claimed is:

1. A method of preparing a catalyst comprising:
   (a) Preparing an aqueous slurry of silicic material and a water soluble molybdenum salt,
   (b) Preparing an aqueous slurry of silicic material and a water soluble tellurium salt,
   (c) Preparing an aqueous slurry of a silicic material and an aqueous solution of a dissolved manganese salt and sufficient $H_3PO_4$ to provide a stoichiometric ratio equivalent to $Mn_2P_2O_7$,
   (d) Combining the slurries defined in (b) and (c) and thereafter combining the latter mixture with the slurry defined in (a),
   (e) Drying the catalyst, and
   (f) Calcining at a temperature of 350° C.-550° C., the proportions of ingredients, being such that the active ingredients of the catalyst have a molar ratio of $Mo_{10}Te_{1-10}/Mn_{2-20}/P_{2-20}/O_{39-120}$ in which the ratio of Mn to P ranges between $Mn_5/P_6$ and $Mn_3/P_2$ and in which the P is combined with 3-4 atoms of oxygen, and the silicic material constitutes from about 35 to about 85% of the catalyst by weight.

2. The method of claim 1 in which the silicic material is a diatomaceous silica.

3. The method of claim 1 in which the silicic material is a silica-alumina containing 85–90% $SiO_2$ and 15–10% by weight of alumina.

4. The method of claim 1 in which the molybdenum salt in component (a) is ammonium molybdate.

5. The method of claim 1 in which the tellurium compound in component (b) is selected from the class consisting of ammonium tellurate and tellurium chloride.

6. The method of claim 1 in which the manganese compound of component (c) is selected from the class consisting of $Mn(NO_3)_2$ and $MnCl_2$.

7. A method of preparing a hydrocarbon oxidation catalyst on a silicic support comprising:
   (a) Add to an aqueous solution of a member selected from the class consisting of ammonium molybdate and molybdic acid a silicic material selected from the class consisting of microspheroidal silica, diatomaceous silica and a silica alumina containing 85–90% silica and 20–10% by weight alumina,
   (b) Adding to an aqueous solution of a tellurium salt a silicic material selected from the class consisting of microspheroidal silica, diatomaceous silica and a silica-alumina containing 80–90% silica and 20–10% by weight alumina,
   (c) Adding to an aqueous solution of a maganese salt and sufficient phosphoric acid to form a phosphate with said manganese a silicic material selected from the class consisting of microspheroidal silica, diatomaceous silica and silica-alumina containing 80–90% silica and 20–10% by weight of alumina,
   (d) Blending the ingredients defined in (b) and (c) above and thereafter adding to the blended ingredients the mixture defined in (a) above,
   (e) Drying the final mixture and calcining at a temperature of 350–450° C., the amount of silicic carrier being sufficient to provide 40 to 85% by weight of the finished catalyst.

8. The method of claim 7 in which the ratio of active ingredients is sufficient to provide a molar ratio of Mo 75/Te 10–45/$Mn_2P_2O_7$ 25–40.

9. The method of claim 8 in which the carrier is diatomaceous silica.

10. The method of claim 8 in which the carrier is silica-alumina.

11. The method of claim 8 in which the carrier is silica having a surface area below 260 sq. m./g.

12. The method of claim 7 in which the tellurium compound is ammonium tellurate.

13. The method of claim 7 in which the tellurium compound is $TeO_2$ dissolved in aqueous HCl.

14. The method of claim 7 in which the manganese compound is manganous nitrate.

15. The method of claim 7 in which the manganese compound is $MnCl_2$.

16. The method of claim 7 in which the molybdenum compound is ammonium molybdate.

References Cited

UNITED STATES PATENTS

| 2,499,255 | 2/1950 | Parker | 196—52 |
| 3,192,259 | 6/1965 | Fetterly et al. | 260—533 |
| 3,228,890 | 1/1966 | Eden | 252—437 |

DANIEL E. WYMAN, *Primary Examiner.*

OSCAR R. VERTIZ, *Examiner.*

L. G. MANDONI, A. GREIF, *Assistant Examiners.*